March 6, 1934. R. S. TAYLOR 1,949,637
ABSORPTION REFRIGERATION APPARATUS
Filed April 22, 1933
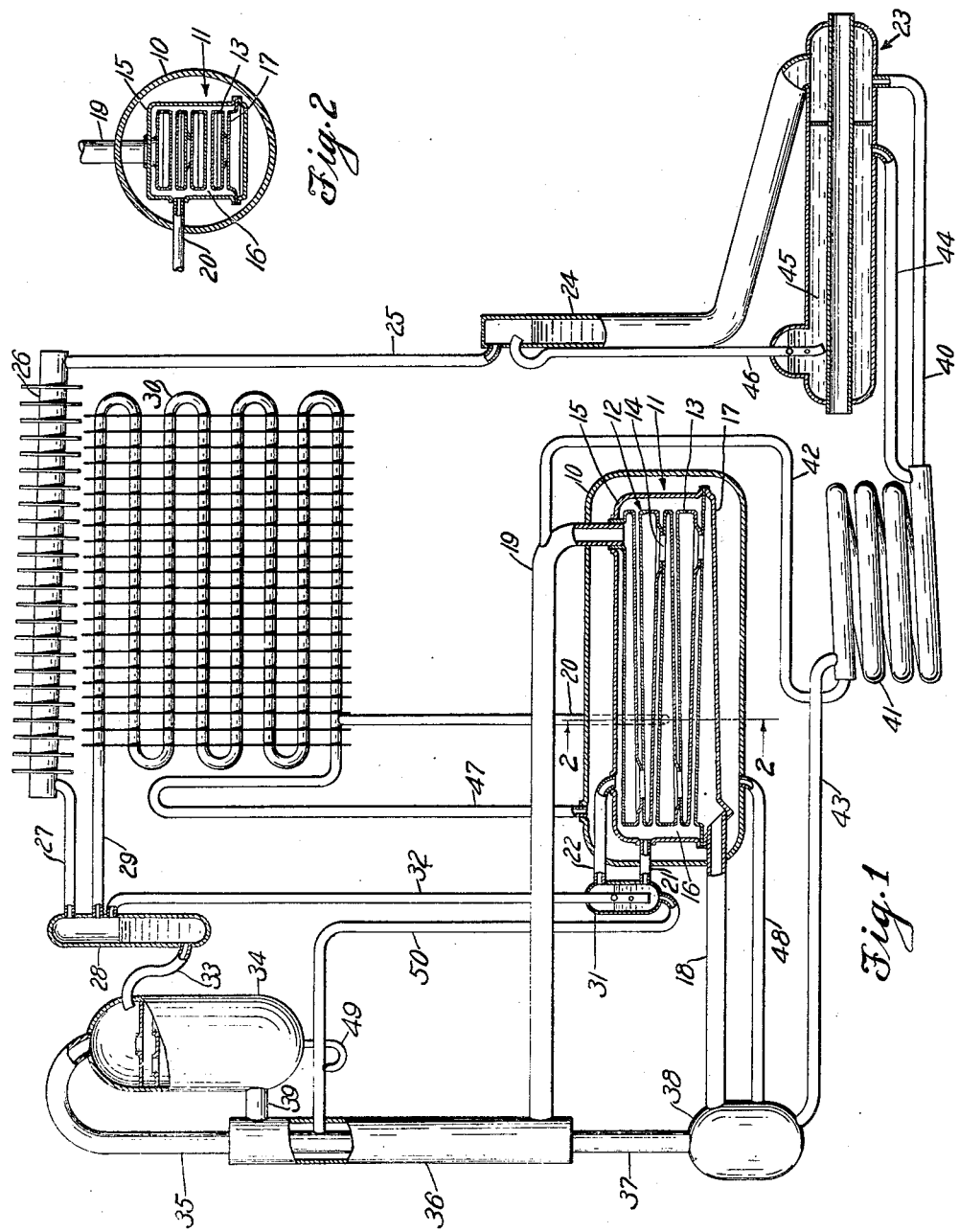

Patented Mar. 6, 1934

1,949,637

UNITED STATES PATENT OFFICE 1,949,637

ABSORPTION REFRIGERATION APPARATUS

Robert S. Taylor, Evansville, Ind., assignor to Electrolux Servel Corporation, New York, N. Y., a corporation of Delaware Application April 22, 1933, Serial No. 667,349

7 Claims. (Cl. 62—119.5)

This invention relates to absorption refrigeration apparatus and more particularly to air cooled apparatus for household refrigerators.

There is contemplated generally a refrigeration system of the character set forth in an application of Albert R. Thomas, Serial No. 613,387, filed May 25, 1932. In a system of this type an inert auxiliary gas is circulated between the evaporator and absorber and liquid refrigerant is evaporated by diffusion into the gas whereby the total pressure is the same throughout the system. The system disclosed in the above mentioned application is characterized by the use of the refrigerant in the system for cooling the absorber, and utilization of the absorber heat to raise the refrigerant liquid from a lowered condenser to the evaporator. When apparatus of this type is air cooled it is desirable that the pressure in the system vary with the room temperature. This is accomplished by means of what is referred to as a pressure vessel, merely comprising a large chamber for storing inert gas at normal room temperature and connected to the outlet end of the condenser. When the room temperature increases to the point where the condenser temperature is higher than the condensation temperature for ammonia at the pressure in the system, refrigerant vapor passes into the pressure vessel, displacing inert gas into the gas circuit between the evaporator and absorber to which the vessel is also connected, thus increasing the total pressure in the system to the point where the ammonia will condense. In order to obtain an appreciable pressure increase, the pressure vessel must have a considerable volume and of course be of sufficient strength to withstand the pressures in the system. In such apparatus the absorber also must have sufficient strength to withstand the pressures in the system.

In accordance with this invention the pressure vessel and absorber are combined in such a manner that very thin sheet metal can be used for the absorber, thus reducing the weight of the apparatus in addition to reducing the bulk. This is of particular importance since not only is the weight reduced but there is provided more space for condenser surface and other cooling surfaces within the structural limitations of such refrigerators.

This invention will be more fully understood from the following description taken in connection with the accompanying drawing, in which, Fig. 1 shows diagrammatically, with parts in vertical section, a refrigeration system embodying the invention; and Fig. 2 is a detail section taken on line 2—2 in Fig. 1.

Referring to the drawing, the system illustrated is the same as that set forth in the above mentioned application of Albert R. Thomas except that the absorber is constructed and combined with the pressure vessel in accordance with the present invention. Referring to both Figs. 1 and 2, the pressure vessel 10 comprises a horizontal cylindrical vessel which, ammonia being used as the refrigerant, is constructed of steel and made of sufficient strength to withstand the internal pressures encountered in operation.

Within the pressure vessel 10 is located the absorber 11 constructed of very light sheet metal since the internal and external pressures are the same, as will hereinafter appear. The absorber 11 comprises an inner sheet metal structure 12 forming a tortuous passage adapted for the continuous downward flow of liquid and upward flow of gas therethrough. The structure 12 is formed of a plurality of vertically spaced horizontal sections 13 communicating at opposite ends through passages 14. The inner structure 12 is enclosed by an outer sheet metal casing or jacket 15 forming a space 16 for cooling fluid around and between the sections 13. The lower absorber section 17 is modified to cooperate with jacket or casing 15 to enclose the cooling fluid space 16. The absorber is provided for circulation of gas therethrough with connections for conduits 18 and 19 and these conduits are also arranged for flow of absorption liquid as hereinafter described to avoid a multiplicty of connections to the absorber through the pressure vessel. Connections for cooling fluid to chamber 16 are made through conduits 20 and 21 and a vapor connection to the upper part of chamber 16 is provided by conduit 22 for the purpose hereinafter set forth.

Other parts of the apparatus are generally known to those skilled in the art and require no detailed description. In operation, assuming for purposes of description the use of ammonia as refrigerant, water as the absorbent, and hydrogen as the inert gas, ammonia vapor expelled from solution in the generator 23 flows from the upper end of generator standpipe 24 through conduit 25 into an air cooled rectifier 26. In the latter, water vapor is condensed out of the ammonia and drains back into the generator, the ammonia flowing from the other end of the rectifier through conduit 27 into a separating vessel 28. From the upper part of the latter, ammonia vapor flows through conduit 29 into an air cooled condenser 30. In the latter, ammonia is condensed to liquid which drains through conduit 20 into chamber 16 around the absorber and through conduit 21 into a pump vessel 31. In chamber 16 ammonia is heated by the absorber and the resulting vapor is conducted from the upper part of the chamber through conduit 22 to the upper part of the pump vessel 31. From the latter, a thermosyphon conduit 32 extends upwardly to the separating vessel 28. Vapor collecting in the upper part of vessel 31 raises liquid ammonia through the thermosyphon conduit 32, in a manner well known in the art, to the separating vessel 28 where the liquid ammonia accumulates in the lower part and the gas returns to the condenser through conduit 29. There is thus provided a secondary or shunt circuit for cooling the absorber including the condenser 30, and absorber cooling chamber 16.

From the lower part of the separating vessel 28, liquid ammonia overflows through conduit 33 into the upper part of the evaporator 34 where it flows downwardly over baffle plates, evaporating by diffusion into hydrogen, as well known in the art. The resulting gas mixture flows through conduit 35, gas heat exchanger 36, conduit 37, vessel 38, and conduit 18 into the lower part of the absorber where it flows upwardly through the sections 13 counterflow to weak absorption solution which absorbs ammonia out of the gas mixture. The weak gas returns from the upper part of the absorber through conduit 19, gas heat exchanger 36, and conduit 39 to the evaporator 34, thus completing the gas cycle.

From the generator 23, weak absorption solution flows through conduit 40, liquid heat exchanger 41, and conduit 42 which is connected to the outlet conduit 19 into the upper part of the absorber where it flows downwardly in contact with the gas flowing therethrough, as previously described. Obviously the sections 13 of the absorber may be provided with any known means such as weirs, baffles, wire gauze, or the like, for retaining weak solution in bodies of extensive surface during its flow through the absorber. Enriched absorption liquid drains from the lower part of the absorber through the gas conduit 18 into vessel 38, from where it flows through conduit 43, liquid heat exchanger 41, and conduit 44 into chamber 45 of the generator from where it is raised through a thermosyphon 46 into the upper part of generator standpipe 24 in a manner well known in the art.

The pressure vessel 10 is connected to the outlet end of condenser 30 by means of conduit 47 and to the gas circuit by means of conduit 48, the latter connection being made to the vessel 38. A drain connection 49 is provided for returning unevaporated liquid from the evaporator 34 into the liquid circuit.

The lower part of the pump vessel 31 is connected through a conduit 50 to that portion of the gas heat exchanger 36 which is connected to vessel 38. Conduit 50 may be referred to as a purge pipe and is provided to facilitate starting. If the absorber cooling chamber 16 and pump vessel 31 should contain only solution it must be replaced by liquid ammonia or a highly concentrated solution before enough vapor pressure is exerted in the upper part of vessel 31 to raise liquid through the thermosyphon 32. However, with the provision of the purge pipe 50, the formation of a liquid column in conduit 20 from the lower part of the condenser will cause overflow of liquid through the purge pipe into the heat exchanger and thence to the liquid circuit through conduit 37 and vessel 38. The solution is replaced by liquid ammonia from the condenser which is accompanied by formation of vapor for pumping liquid into the separating vessel 28.

It will be clear from the above description that the pressures in the absorber, the absorber cooling chamber 16, and pressure vessel 10 are equal, being parts of the same pressure equalized system wherefore the absorber and cooling jacket are subjected to no pressure difference and therefore may be constructed of very light material. The absorber being placed within the pressure vessel allows space for the condenser which has not heretofore been available resulting in greater adaptability of this type of apparatus for household refrigerators having limited space requirements.

It will be obvious to those skilled in the art that various other changes may be made in the construction and arrangement without departing from the spirit of the invention and therefore the invention is not limited to what is shown in the drawing and described in the specification but only as indicated in the following claims.

I claim:

1. In an absorption refrigeration system of the pressure equalized type, a storage vessel for pressure equalizing gas connected in said system, and an absorber located within said vessel.

2. In an absorption refrigeration system of the pressure equalized type, a gas storage vessel, an absorber, and cooling means for said absorber utilizing refrigerant fluid in said system, said absorber and cooling means being located within said vessel.

3. In absorption refrigeration apparatus of the pressure equalized type, a gas storage vessel, an absorber, and a cooling jacket for said absorber connected for circulation of primary refrigerant fluid therethrough, said absorber and cooling jacket being located within said vessel.

4. A refrigeration system comprising, an evaporator and absorber interconnected for circulation of inert gas therebetween, a generator interconnected with said absorber for circulation of absorption solution therebetween, a condenser connected to receive refrigerant vapor from said generator, a cooling jacket around said absorber connected to receive liquid refrigerant from said condenser, a vapor liquid lift for raising liquid refrigerant from said jacket to said evaporator, a vent for gas from the outlet of said condenser to the gas circuit between said evaporator and absorber, and an enlarged chamber in said vent, said absorber and cooling jacket being positioned within said chamber.

5. A refrigeration system comprising, a generator, a condenser, an absorber, an evaporator, a gas circuit including said evaporator and absorber, means for conducting liquid from said condenser to said evaporator extending in heat exchange relation with said absorber, and a pressure vessel connected between said condenser and said gas circuit, said absorber being located within said vessel.

6. In an absorption refrigeration system having a circuit for pressure equalizing gas, a chamber communicating with said gas circuit, and an absorber located within said chamber and constructed of light sheet material.

7. In an absorption refrigeration system having a circuit for pressure equalizing gas, a chamber communicating with said circuit, an absorber of relatively light construction within said chamber, a cooling jacket for said absorber also of light weight construction connected for flow therethrough of liquid refrigerant in said system.

ROBERT S. TAYLOR.